Patented June 25, 1935

2,005,730

UNITED STATES PATENT OFFICE 2,005,730

CASEIN PRODUCTS AND PROCESS OF MAKING

Henry V. Dunham, Bainbridge, N. Y.

No Drawing. Application November 28, 1932,
Serial No. 644,752

13 Claims. (Cl. 260—9)

This invention relates to the compounding of casein with metallic salts or other inorganic or organic compounds capable of modifying casein for the production of casein products, and its principal object is to provide a rapid and economical process for producing such products.

The process consists essentially in mixing casein with a small amount of water or other suitable plasticizing agent and an alkali or a salt which renders the casein water-soluble or other appropriate modifying compound or compounds and subjecting the mass to further mixing preferably by kneading under a high pressure, with or without the application of heat, in such a manner as to bring about a combination or homogeneous commingling of the ingredients.

The terms "reaction" and "reactive" are used herein in a broad sense, and are not intended to limit the scope of the invention to reaction in a purely chemical sense but are used to include all changes of a chemical or physical character whereby the properties of the casein are modified and particularly changes wherein the casein is rendered soluble. A given substance although not chemically active, may produce marked changes in the casein and the product derived from it under the conditions described.

As an illustration of one method of procedure in carrying out the invention the preparation of sodium caseinate will be described: To 100 parts of commercially dry casein of good quality (e. g. a casein precipitated by hydrochloric acid) containing say 10 to 15% of water and ground to pass through e. g. a 24 mesh wire sieve, is added 25 parts of cold water, and this mixture is stirred in any convenient type of mixer for a short time, say for about 20 minutes, until the water has been absorbed. This gives a "moist casein" containing about 30% (or 28 to 32%) of water. Then a sodium compound which is a mild alkali is added, in suitable amount, such as 7 parts of commercial sodium bicarbonate and mix for about 10 minutes. The sodium bicarbonate can be referred to as a solublizing agent, since, as well known, it renders casein soluble in water, when sufficient water is added. The resulting mixture is in a powdery condition and feels only slightly moist. This mixture is then fed into a kneading and extruding machine, in which is worked intimately together under a high pressure with the simultaneous application of external heat, whereby it is converted into a stiff pasty condition and forced through the nozzle of the machine, from which it emerges, e. g. in the form of a ribbon. The extruded mass is then dried and may thereafter be ground to a coarse or fine powder. The product made by this process is stable in the dry state, and is readily soluble in water. An aqueous solution of this may be used either alone or with the addition of other materials as a glue or sizing. For the preparation of a glue the powder may be mixed with lime and sodium fluoride and the mixture can then or subsequently be added to water, and this mixture is distinguished from an ordinary mixture of casein, sodium carbonate, sodium fluoride and lime by the rapidity with which it passes into solution, this ready and rapid solubility constituting (in many cases) an important advantage.

In like manner casein can be compounded with other sodium or potassium salts (which may be mildly alkaline, if desired) such as borax, sodium fluoride or potassium phosphate, or a plurality of salts may be used. These alkaline compounds also, as well known, render the casein soluble in water.

The extruding machine consists of a conveyor-screw rotating within a cylinder which preferably is surrounded by a water-jacket. At the discharge end is a grid or series of grids and a nozzle through which the charge is forced. The charge is fed into a hopper at one end of the machine and is carried forward by the conveyor-worm and compressed against the sieves where it assumes a plastic condition and is forced through the grids and out of the nozzle. In this type of machine the pressure on the mass just before it leaves the machine may amount to upwards of 20,000 pounds per square inch, and even where no external heat is supplied the material comes from the nozzle as a plastic and warm mass due to the heat of compression and in some cases an exothermic reaction between the ingredients. The pressure can be regulated by varying the size of the holes in the grids, and the temperature can be controlled by circulating hot or cold water or other fluid through the jacket. This machine is therefore capable of wide adaptation and affords a convenient means of treating charges of the most varied chemical and physical character.

It may be noted that an important feature of this process is the use of a comparatively small proportion of water in the caseinous mass, whereby the subsequent evaporation of a large volume of water is rendered unnecessary. The amount of water in the charge may be in some cases as little as 25 to 30% of the weight of the casein. This corresponds to a ratio of casein to water, of about 3:1 to 7:3. As an illustration of the advantages of this process, for example in the manufacture of sodium caseinate, it may be compared with a method which is commonly employed, in which the casein is dissolved in a relatively large amount of water with alkali added and the solution is dried by spraying it onto steam heated rolls or can be dried in a vacuum drum drier. By this latter method 100 pounds of casein are mixed with 400 pounds of cold water and about 8 pounds of sodium bicarbonate. The mixture is heated to about 140° F. and stirred to assist the dissolving. When the casein is completely dissolved, the solution is diluted with at least 1500 pounds of water. The proportion of casein to water is thus about 1 to 19. This dilution is necessary because of the technical difficulties of drying a concentrated solution of sodium caseinate. The dilute solution is sprayed onto steam heated drums as mentioned above and the resulting dry material may be ground and sifted and is then ready for use. Such a product is utilized as an edible casein, e. g. in making diabetic foods.

A method which has been suggested for making a casein-iron compound is as follows: 1 part of freshly precipitated casein of pure quality is mixed with 1 part of calcium carbonate and 100 parts of water. After being filtered the clear solution is mixed with a solution of iron lactate. The precipitated product is filtered, washed, dried and powdered. It is insoluble in water. This method is obviously tedious and expensive.

By my improved process an iron-casein compound suitable for medicinal purposes can be produced by proceeding as follows: Mix 100 pounds of a good commercial grade of casein with 24 pounds of water and allow to stand for about 1 hour. Add 8 pounds of ferric hydroxide, mix together and pass the mixture through the extruding machine preferably with external heating. Dry and grind the mass. The product is a dark brown powder insoluble in water and containing about 4.5% Fe.

Another casein-iron preparation may be made in a similar manner by mixing 5 parts of casein and 1 part of water, later adding 1 part of iron lactate, kneading and extruding. This product is insoluble in water but soluble in alkalies. It may be ground to a fine powder, mixed with 1.5 parts of water and 0.72 part of sodium bicarbonate and again passed through the extruding machine. The final dry product, which is soluble in water, contains about 3% Fe.

A casein-copper product can be made by mixing a solution of 12.5 ounces of pure copper sulphate in 2.5 pounds of water with 10.0 pounds of casein and treating the mixture in the extruding machine, drying if desired, and thereafter grinding the product, mixing with 1.3 pounds of sodium bicarbonate in 2.5 pounds of water and re-treating in the extruding machine. The end product contains about 2% Cu and is soluble in water.

For making a casein-naphthionic acid product 20 parts of casein are soaked in 5 parts of water for about twenty minutes, and then 2 parts of powdered naphthionic acid is stirred in. The mixture is run through the extruding machine and the extruded product is dried and ground. The final product is useful for the making of casein adhesives, for which purpose it may be mixed with lime, sodium carbonate, tri sodium phosphate and/or other alkalies as commonly used, and then dissolved in water. The glue so prepared is very tacky and dries more rapidly than a glue similarly prepared from untreated casein, which is an advantage for some purposes.

The products thus obtained are useful for various purposes. Sodium caseinate and potassium caseinate, for instance, may be used in foods and for medicinal purposes, and also in glues and sizings. Some of the products are very desirable for the manufacture of casein paints on account of their uniformity and ready miscibility with water and other liquids. Other uses will be apparent.

In a similar manner other compounds can be incorporated with casein, and by varying the proportions of such compounds and the temperature and pressure within the machine a great variety of useful compositions can be obtained. The exact chemical constitution of these products has not been ascertained. It is probable that in some cases definite chemical combination takes place while in others there may be only an intimate mingling of the ingredients to produce a homogeneous material the components of which cannot be separated by any mechanical means.

It will be understood that in a similar way many other substances can be incorporated with casein e. g. wood flour, whiting, clays and pigments, and other modifying agents such as dextrine, starch or starchy materials and proteinous substances such as hide glue and seed meals e. g. peanut meal. Substances as defined in this paragraph may be termed "fillers" for brevity, and hereinafter said term is intended to embrace these materials, whether or not they also perform other functions, and some of them, e. g. whiting, seem to perform other useful functions, and may affect the solubility. It will be understood also that softening or plasticizing agents such as glycerine, waxes, etc., can also be added, for example before or during introduction of the mass into the kneading and extruding machine, or later.

The incorporation of such materials as described in this paragraph with moist casein is claimed in a copending application Ser. No. 18,436, filed April 26, 1935.

The incorporation of certain metal salts and the products thereby produced, have been described herein, and the use of such salts and of certain other salts and of certain metal hydroxides, is claimed in my copending application, Ser. No. 18,435, filed April 26, 1935.

It is of course not essential to use the type of blending and extruding machine which I have described above. Any method which includes the basic features of this specification may be substituted.

I claim:—

1. As a product, an extruded composition of casein and a chemical capable of increasing the solubility of casein in water, in a dry comminuted condition soluble in water.

2. As a product, an extruded composition of casein and a chemical adapted to act as an agent to render casein soluble in water, in a dry comminuted form, soluble in water.

3. As a product, an extruded composition of casein and an alkali, in dry water-soluble form.

4. A process which comprises mixing with casein, an agent which, when mixed with enough water, will render the casein soluble in water, in the presence of an amount of water which is a minor fraction only of the amount of casein, thoroughly incorporating such materials together and extruding the mass, while being subjected to the action of sufficient heat and pressure during some part of such incorporating and extruding process, to plasticize and homogenize the materials, and drying the extruded material.

5. A process which comprises mixing an alkaline compound having a solublizing action on casein, with casein, in the presence of an amount of water which is a minor fraction only of the amount of casein, thoroughly incorporating such materials together and extruding the mass, while at a sufficient temperature and while under sufficient pressure during some part of such incorporating and extruding process, to plasticize and homogenize the materials, drying and comminuting the extruded material.

6. A process which comprises mixing with casein, in the presence of an amount of water which is a minor fraction only of the amount of casein, a compound of a metal selected from the group consisting of alkali metals and alkaline earth metals, which compound is capable of reacting with casein to form a water-soluble casein compound, thoroughly incorporating such materials together and subjecting the mass to sufficient heat and pressure to plasticize and homogenize the materials and thereafter drying and comminuting the product.

7. A process which comprises mixing casein, in the presence of an amount of water which is a minor fraction only of the amount of casein, with an alkaline substance capable, in the presence of much water, of rendering casein soluble, thoroughly incorporating such materials together and subjecting the mass to sufficient heat and pressure to plasticize and homogenize the materials and thereafter drying and comminuting the product.

8. A process which comprises mixing an alkaline reagent with casein in the presence of an amount of water which is a minor fraction only of the amount of casein, thoroughly incorporating such materials together and subjecting the mass to sufficient heat and pressure to plasticize and homogenize the materials, and thereafter drying and comminuting the product.

9. A process which comprises mixing an alkaline compound of an alkali metal with casein, in the presence of an amount of water which is a minor fraction only of the amount of casein, thoroughly incorporating such materials together while kneading the mass, and while applying during some part of such process sufficient heat to plasticize and homogenize the materials and drying the so treated material.

10. As a product, an extruded composition of casein with naphthionic acid, in a dry state.

11. A process which comprises mixing moist casein containing substantially less water than casein, with such amount of an alkaline substance as would, in the presence of a large volume of water, render such casein water-soluble, kneading the mass, extruding the moist mass and subjecting the mass to heat and high pressure during a part at least of said kneading and extruding operations, and drying the extruded mass.

12. A process which comprises mixing with casein, in the presence of an amount of water substantially less than the amount of said casein, enough of an alkaline reagent to convert all of said casein into a water-soluble casein compound, thoroughly incorporating such materials together while kneading the mass, and applying during some part of such process sufficient heat to plasticize and homogenize the materials, and drying the said material.

13. As a product of manufacture, an extruded composition of casein and a chemical capable, in the presence of water, of rendering the casein soluble in water, such product being a substantially dry water-soluble solid material.

HENRY V. DUNHAM.